Sept. 1, 1964　　　　　　　　　E. ENGEL　　　　　　　3,146,972
EMERGENCY CONTROL SYSTEM FOR AIRCRAFT
Filed Feb. 28, 1962　　　　　　　　　　　　　　　　6 Sheets-Sheet 2

INVENTOR.
ERVIN ENGEL
BY
ATTORNEY

Sept. 1, 1964        E. ENGEL        3,146,972

EMERGENCY CONTROL SYSTEM FOR AIRCRAFT

Filed Feb. 28, 1962        6 Sheets-Sheet 3

INVENTOR.
ERVIN ENGEL
BY

ATTORNEY

Sept. 1, 1964 E. ENGEL 3,146,972
EMERGENCY CONTROL SYSTEM FOR AIRCRAFT
Filed Feb. 28, 1962 6 Sheets-Sheet 4

INVENTOR.
ERVIN ENGEL
BY
ATTORNEY

Fig. 8

Sept. 1, 1964 E. ENGEL 3,146,972
EMERGENCY CONTROL SYSTEM FOR AIRCRAFT
Filed Feb. 28, 1962 6 Sheets-Sheet 6

INVENTOR.
Ervin Engel
BY
ATTORNEY

United States Patent Office 3,146,972
Patented Sept. 1, 1964

3,146,972
EMERGENCY CONTROL SYSTEM FOR AIRCRAFT
Ervin Engel, 235 E. 89th St., New York, N.Y.
Filed Feb. 28, 1962, Ser. No. 176,391
5 Claims. (Cl. 244—76)

This invention concerns an auxiliary emergency control system for aircraft and spacecraft.

According to the invention, there is provided on an aircraft or other vehicle having main drive engines, a plurality of auxiliary engines arranged to supply forceful thrusts in lateral, up and down forward and rearward directions to overcome emergency conditions while the aircraft is in flight.

The auxiliary engines are arranged in four groups of four engines each. The exhaust pipes of the engines in each group are disposed in angular directions. The exhaust pipe of each engine is directed at 45° to horizontal and vertical planes longitudinally and 45° outwardly of its stationary position on the fuselage.

The object of the invention is to provide switches on the control board to be actuated by the pilot for controlling the auxiliary rocket and jet engines, independent of the gravity controlled switches, in order to level off the airplane, go to the right or left, go up or down, make an emergency landing and rise from an emergency field.

A further object is to provide a system as described, wherein a manually and automatically gravity operated switch is associated with each auxiliary engine, and is adapted to be brought into circuit therewith for actuation to operate the engine when the vehicle assumes a dangerous orientation in space.

Still another object is to provide a system as described wherein each emergency engine is under control of a plurality of manually operable switches located at different positions in the vehicle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure.

Figures 1, 3, 4:
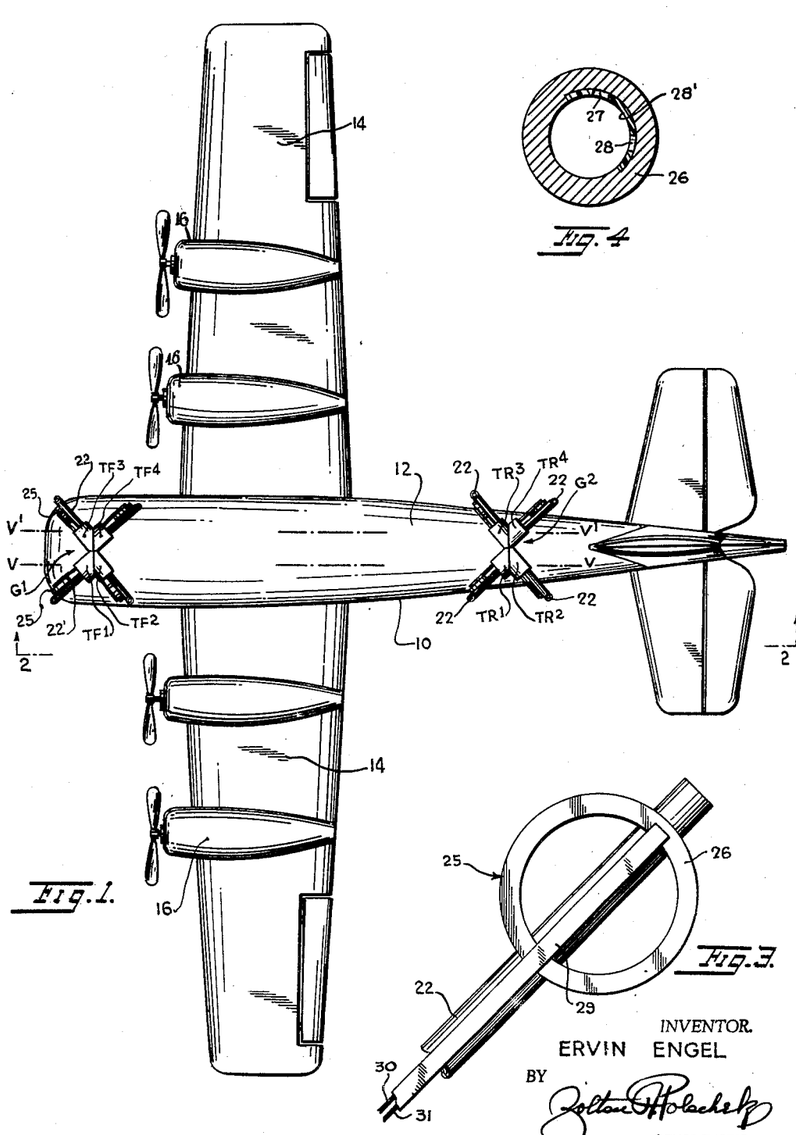
FIG. 1 is a top plan view of an airplane embodying a control system according to the invention.
FIG. 3 is a side elevational view on an enlarged scale of a gravity operated switch and associated engine exhaust pipe.
FIG. 4 is a sectional view on a further enlarged scale taken on line 4—4 of FIG. 5.
Figure 2:
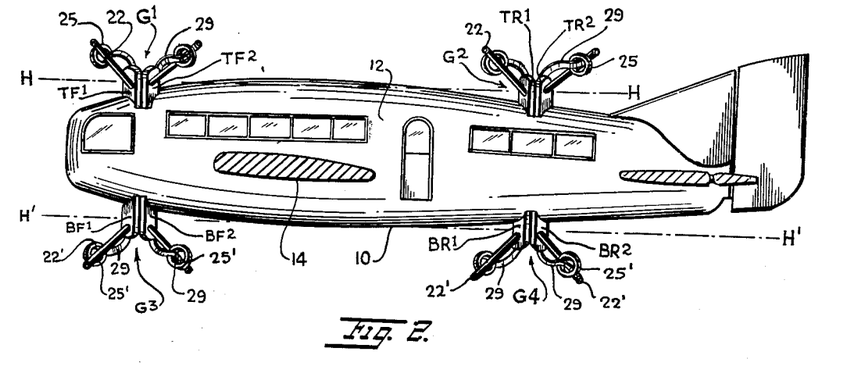
FIG. 2 is a sectional view taken on line 2—2 of FIG. 1, with parts of the control system shown in side elevation.

Referring first to FIGS. 1 and 2, there is shown an airplane 10 which has a fuselage 12 and laterally extending wings 14. On the wings are engines 16 of any conventional type such as jet motors, turbine motors, etc. These are the main engines of the airplane.

On the top front of the fuselage is mounted a first group G1 of four auxiliary engines. The individual engines are designated respectively TF1, TF2, TF3 and TF4. These may be conventional rocket engines, jet engines or the like having conventional electrical starting or ignition circuits. Each engine has an upwardly and outwardly extending gas exhaust pipe 22. The thrust of each individual engine will be directed axially of pipe 22 outwardly from the airplane. The axis of each exhaust pipe is disposed 45° to a common horizontal plane H and 45° outwardly of its stationary position on the fuselage. The axes of the exhaust pipes 22 of engines TF1, TF3 are directed in mutually perpendicular vertical planes spaced 90° apart and 45° from the longitudinal axis of the airplane. These two exhaust pipes thus point forwardly, upwardly and outwardly to the left and right of the fuselage as viewed in plan in FIG. 1. The axes of the exhaust pipes 22 of engine TF2, TF4 are directed in mutually perpendicular vertical planes spaced 90° apart and 45° from the longitudinal axis of the airplane. These two exhaust pipes thus point rearwardly, upwardly and outwardly to the left and right of the fuselage as viewed in plan in FIG. 1. Secured to each exhaust pipe is a gravity operated switch 25.

A second group G2 of four auxiliary engines is mounted on the top rear of the fuselage. These engines are respectively designated TR1, TR2, TR3 and TR4. The engines and exhaust pipes with attached gravity switches are arranged like the engines, pipes and switches on the top front of the fuselage.

A third group G3 of four auxiliary engines is mounted on the bottom front of the fuselage directly below the first group G1. The individual engines are designated BF1, BF2, BF3 and BF4. Only engines BF1 and BF2 are shown in FIG. 2. Engines BF3 and BF4 are indicated schematically in FIG. 11 and are located directly below engines TF3 and TF4, respectively.

Figure 11:
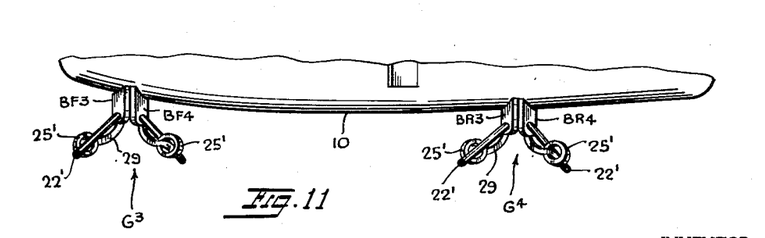
FIG. 11 is a fragmentary elevational view of the side opposite FIG. 2.

A fourth group G4 of auxiliary engines is mounted on the bottom rear of the fuselage directly under group G2. The engines of group G4 are designated BR1, BR2, BR3 and BR4. Engines BR3 and BR4 are indicated in FIG. 11. Only BR1 and BR2 are shown in FIG. 2.

Each engine of groups G3 and G4 has a downwardly and outwardly directed exhaust pipe 22' so that the thrust of the engine is directed axially of the pipe away from the airplane. The axis of each exhaust pipe 22' is disposed 45° to horizontal plane H' and 45° outwardly of its stationary position of the fuselage. A gravity switch 25' is attached to each pipe 22'.

The four groups of auxiliary engines on the fuselage constitute eight pairs, the exhaust pipes of each pair pointing in the same direction, which engines may be regarded as located at the four upper and four lower corners, respectively, of a rectangular parallelepiped, bounded by upper horizontal plane H', lower horizontal plane H, and spaced vertical planes V, V'. Engines TF1, TR1 constitute one pair; TF2, TR2 the second pair; TF3, TR3 the third pair; TF4, TR4 the fourth pair; BF1, BR1 the fifth pair; BF2, BR2 the sixth pair; BF3, BR3 the seventh pair; BF4, BR4 the eighth pair. These pairs are oriented in exactly the same direction. Each pair has double thrusting power. The individual pipes of each pair are parallel.

The auxiliary jet engines are small and are shown in prior art patents and are mounted on the fuselage of the airplane in any suitable or conventional manner so that sufficient air is directed to the mouths of the engines. The engines are also throttled in a conventional manner as shown in prior art patents.

Figure 5:
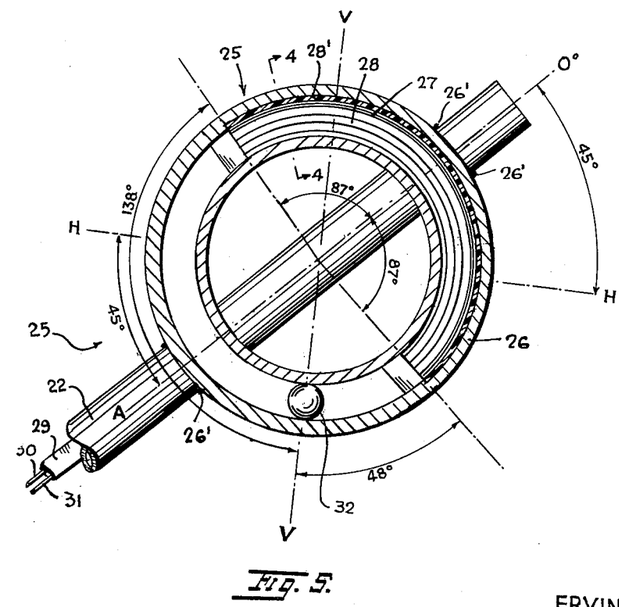
FIG. 5 is a sectional view on an enlarged scale taken through the center of a switch tube.

FIGS. 3–5 show details of the gravity switches 25 and 25'. Each switch includes an endless metal tube 26 which is welded to pipe 22 as indicated at 26' and is provided at its bottom end as viewed in FIG. 5 with spaced bus bars 27 and 28 extending from 0° to 87° on both sides thereof. The bus bars are insulated from each other by insulation 28' and are connected by conductors 30 and 31 in an insulating cover 29 to its respective auxiliary engine. In tube 26 there is a freely movable metal ball or pool of mercury 32. The conductive ball 32 serves as a movable contact element which is normally disposed at the lowermost point of the tube 26, but is freely movable along the tube. The ball is of such a size that it can span the bus bars and connect the bars. The axis A of pipe 22 is oriented 45° to horizontal plane H as indicated in FIG. 5. The axis bisects each bus bar 27 and 28 at points indicated at 0°. Thus, each bus bar extends 87° arcuate each side of the axis A. The tube is mounted on the pipe so that the pipe extends across the center of the tube with its axis A disposed across the point 0° shown in FIG. 5 at the exhaust end of the pipe 22.

Figure 6:
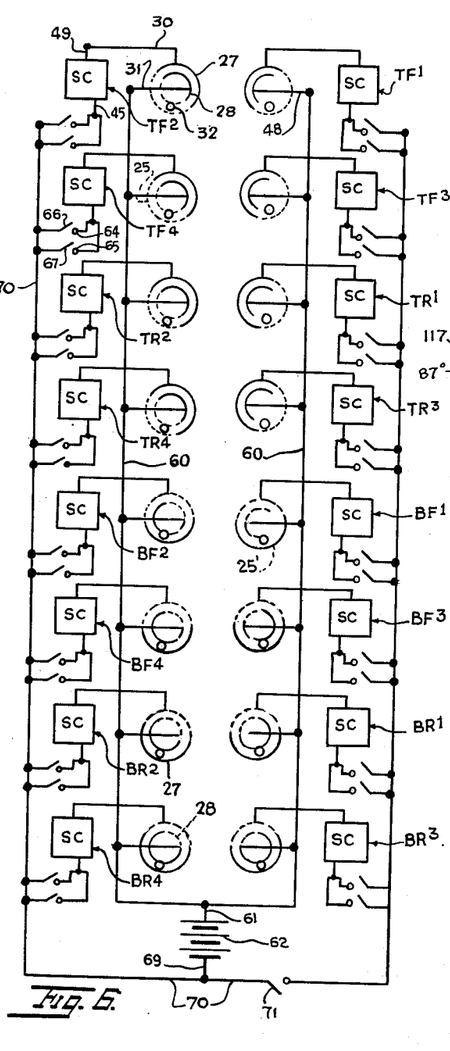
FIG. 6 is a schematic diagram of an electrical control circuit employed in the airplane control system according to the invention.

FIG. 6 illustrates schematically essential parts of an electrical circuit employed in the system. Bus bars 27 and 28 of eight gravity switches 25 and eight switches 25' are shown radially spaced. Balls 32 are vertically spaced from the bus bars and movable to close electric circuits 25' therebetween. Each of bus bars 27 is connected via wire 30 to one terminal 49 of a starting circuit SC of the associated auxiliary engine. Each wire 31 connects bus bar 28 to bus bar 60. Bar 60 is connected to one terminal 61 of battery or power supply 62. The other terminal 45 of each starting circuit is connected to two fixed contacts 64, 65 of two manually operable switches 66, 67. The switches 66, 67 are connected in parallel to bus bars 70 which terminate at the other terminal 69 of power supply 62 and the bars are controlled by manual switch 71.

It will be noted that there is a pair of switches 66, 67 connected in parallel with each gravity switch and with each starting circuit SC of each auxiliary engine. One switch of each of these pairs of switches may be located on a control panel (not shown) accessible to the pilot of the airplane. The other one of each of these pairs of switches may be located on another control panel (not shown) accessible to a copilot, flight engineer, hostess or other flight attendant. Alternatively, the other switches may be mounted on a control panel (not shown) located in the fuselage 12 in a position for operation only in an emergency by a passenger.

In all positions of the airplane as shown in FIGS. 1, 2 and 11, there are eight bottom pipes 22 or 22' pointing or opening obliquely toward the earth and the other eight upper pipes 22 or 22' are pointing obliquely upwardly away from the earth. In the eight tubes carried by the lower eight pipes pointing obliquely toward the earth, the balls 32 span the bus bars 27 and 28 and connect the bars, and the bars 27 and 28 are connected by conductors 30 and 31 with the auxiliary engines. In the other eight tubes carried by the upper pipes pointing obliquely away from the earth, the balls 32 are away from the bars and the bars are disconnected.

During the tilting and all other movements of the airplane, the tubes turn bodily relative to the balls as gravity tends to keep the balls in the same downward position. Simultaneously with the movement of the tubes, the balls 32 will reach the bus bars 27 and 28 in the tubes of the 32 which are pointing toward the ground and connect the auxiliary engines. In all other tubes of pipes pointing away from the ground, the balls 32 leave the bus bars 27 and 28 and disconnect the auxiliary engines.

In order to provide less vibration, the tubes for the auxiliary engines might be mounted separately on brackets supported on the fuselage so that the tubes are arranged in the same manner with respect to the axes of the exhaust pipes.

Accordingly, as viewed in FIGS. 1, 2, 11, in the eight endless tubes 26 of switches 25 mounted on auxiliary engines BF1, BF2, BF3, BF4, BR1, BR2, BR3, BR4, the balls 32 span the bus bars 27 and 28 in the tubes and electrically connect the bars. If the airplane is turned to the port side, the pipes 22' on the auxiliary engines BF1, BF2, BR1, BR2 will point directly downward, while the pipes of engines BF3, BF4, BR3, BR4 will point upwardly after leaving the horizontal position. The balls 32 in tubes 26 of the downwardly pointing pipes will remain in contact with bus bars 27, 28 and electrically connect the bars. At the same time, the balls in the tubes of the upwardly turned pipes of engines BF3, BF4, BR3, BR4 will be out of contact with their bus bars.

When the airplane turns to the port side as above mentioned, pipes 22 of engines TF1, TF2, TR1, TR2 turn downwardly after leaving horizontal position and the balls in tubes 26 make contact with their bus bars 27, 28 and these engines are connected in circuit with the bus bars. At the same time, the pipes 22 of engines TF3, TF4, TR3, TR4 turn upwardly but their switches 25 remain open as the balls 32 remain out of contact with bus bars 27, 28.

A reverse action occurs when the airplane turns to the starboard. Then the pipes of engines BF3, BF4, BR3, BR4 point directly downward and their engines are in circuit with closed switches 25' while the switches of engines BF1, BF2, BR1, BR2 whose pipes turn upwardly after leaving horizontal position are open circuited. Similarly, the pipes of engines TF3, TF4, TR3, TR4 turn downwardly after leaving horizontal position and their switches 25 are closed by balls 32 while the pipes of engines TF1, TF2, TR1, TR2 turn up and their switches remain open.

If the airplane turns downward at the front end, the pipes 22 and 22' of engines TF1, TF3, TR1, TR3, BF1, BF3, BR1, BR3 point downwardly while the pipes 22, 22' of the other engines point upwardly.

If the airplane turns downward at the rear or stern end the pipes 22 or 22' of engines TF2, TF4, TR2, TR4, BF2, BF4, BR2, BR4 point downwardly and the pipes of the other engines point upwardly.

The switches 25 are so arranged, as will be noted in FIG. 5, that when a pipe 22 at the upper side of the airplane becomes downwardly after leaving horizontal position the ball 32 closes the switch between bus bars 27, 28, and when a pipe at the upper side points obliquely upward the switch remains open. Switches 25', when a pipe becomes upwardly after leaving horizontal position the circuits are opened, and when the pipes 22' point obliquely downward the switches 25' remain closed.

This arrangement insures that every exhaust pipe simultaneously cooperates with each other so that there will be no undesirable rotational or tilting movements of the airplane. The gravity and manually controlled engines provide the correct turns, tilts, slips, rotations and falls. The manually controlled switches are operated separately from the gravity controlled switches and are adapted to provide vertical takeoff, vertical landing, and when in air, going up, down, forward, rearward, right, left and turning in all directions with respective auxiliary engines, said operations adapted to work even upon failure of the main engine and collapse of the wings.

It will be understood that the auxiliary jet engines may be mounted inside the fuselage and when so mounted, the engines are arranged similarly as on the outside.

It will be understood that means will be provided for directing air to the auxiliary jet engines on the outside of the fuselage as well as to the jet engines inside the fuselage.

Figure 7:
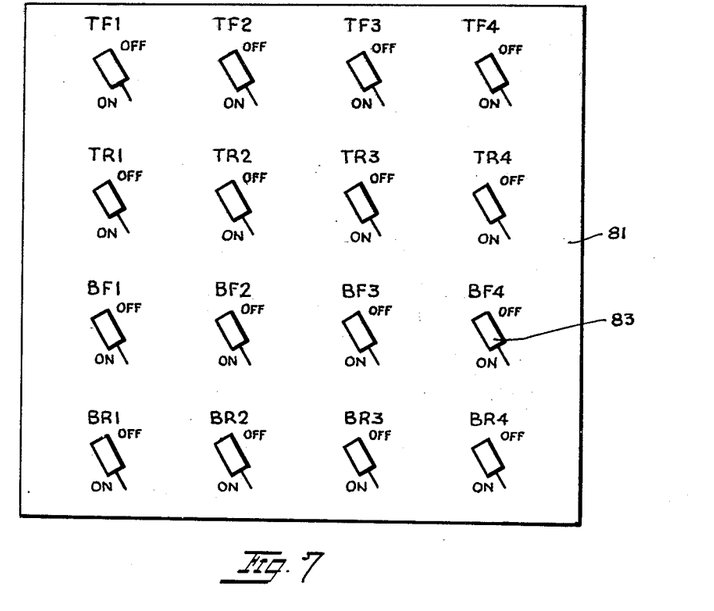
FIG. 7 is a front elevational view of the control board.

The manual switch system is only manually controlled from the control board by the pilot. In FIG. 7 there is shown a control board 81 with sixteen switch knobs 83 which control the actuation of the various auxiliary jet engines. By turning each knob, its respective auxiliary engine is brought into circuit but not its tube 26 which is in a separate circuit and controlled by a separate switch.

When the pilot wants to level off the airplane, maneuver it to the right or left or up or down or to provide a safe landing and/or rise from an emergency field, or to provide vertical take-off or vertical landing with the bottom exhaust pipes, or to drive forward the airplane with the rearwardly auxiliary engines when the main driving engines fail or the wings collapse, the auxiliary jet engines are operated. This is done by turning the knobs 83 on the control board 81 for the desired auxiliary engines. The airplane is provided with a separate electrical circuit similar to the electrical circuit shown in FIG. 6 for starting the gravity controlled switches. This separate or main electrical circuit of the airplane is now closed by the pilot. The closing of the separate or main electrical circuit automatically brings the auxiliary engines into circuit which the pilot desires.

Figure 8:
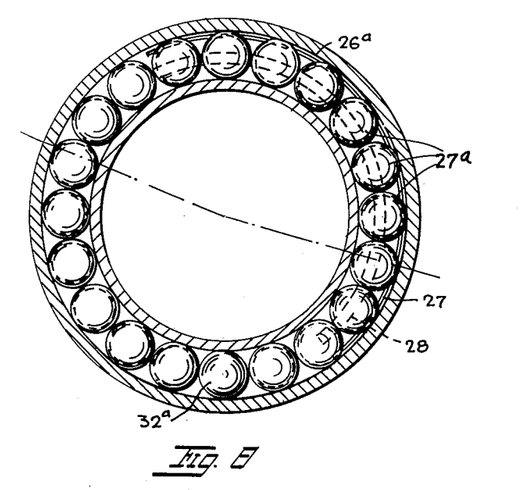
FIG. 8 is a view similar to FIG. 5 showing a modified form of tube.

In FIG. 8 is shown a modified form of tube 26ᵃ wherein a series of hollow plastic balls 27ᵃ are placed in the tube in order to limit the movement of the metal ball 32ᵃ. The plastic balls prevent the metal ball from swinging up and down in the tube but permit the metal ball because of its weight to gravitate to lowermost operative position. The weight of the plastic balls and the weight of the metal ball must be such that they balance each other so that the metal ball will be held in lowermost operative position. The plastic balls are also used because they are nonconductive.

For emergency purposes, the controls of the gravity switches may include an automatic pilot, air-speed indicator, altimeter or other instrument.

The invention makes it possible to supplement the main engines of an airplane with auxiliary engines and also assist the main engines in overcoming emergency conditions of position and acceleration. The invention has been explained in connection with an airplane which may be of any type, propeller driven or propellerless, helicopter, etc. The invention is applicable to spacecraft driven by rocket engines or otherwise. Application of the invention to vehicles of other types will readily occur to those skilled in the art.

In the operation of the auxiliary engine system, it is not necessary that all 8 of the auxiliary engines be operating. A number, less than all, of the engines can control the aircraft sufficiently to permit safe landing and to permit the occupants to make the necessary preparations for jumping out with their parachutes.

While I have illustrated and shown sixteen auxiliary rocket engines, it will be understood that more or less than sixteen might be used if desired.

Figure 9:
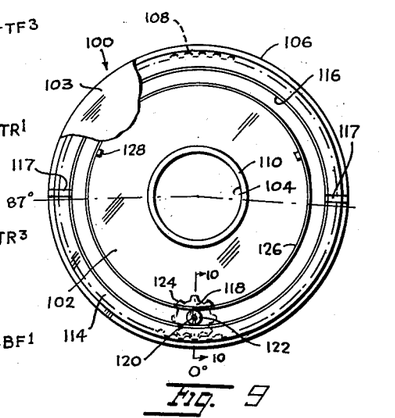
FIG. 9 is a view similar to FIG. 8 of another modified form of switch.
Figure 10:
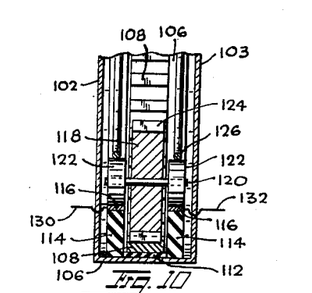
FIG. 10 is a sectional view taken on the line 10—10 of FIG. 9.

In FIGS. 9 and 10 another modified form of switch 100 is illustrated, which switch is gravity operated similarly to switches 25 and 25'. The switch comprises a tubular device or movable pinion cage having a circular body including two spaced metal plates 102, 103 with central openings 104. The space between the plates is closed at the outer periphery thereof by a metal ring 106 formed with internal teeth 108. The ring is welded to the edges of the plates. At the center the space is closed by an inner ring 110. The outer ring 106 with teeth 108 constitutes an internal gear or trackway.

A section of the outer ring 106 at the bottom as viewed in FIG. 9 and extending from the lowermost point thereof indicated at 0° upwardly to a point 87° on each side thereof is provided with a strip of insulation 112, which lines the inner surface of the outer ring 106. The strip has outwardly extending side walls 114, 114 and supported on the outer edges of the side walls are endless metal electrical bus bars 116, 116 extending all around the space between the plates. The section of bus bar 116 above 87° as shown in FIG. 9 is insulated from the conductive section thereof by insulation 117.

A metal pinion 118 is mounted on the internal gear or trackway and adapted to move freely therealong. The pinion carries an axle or shaft 120 extending on both sides thereof. A metal roller 122 is mounted on each of the protruding ends of the axle or shaft and is freely rotatable thereon. The teeth 124 of the pinion are adapted to mesh with the internal teeth 108 on the outer ring 106.

Spaced endless round rods 126 are supported by brackets 128 on the inner surface of plate 102 in line with the rollers 122 in order to prevent the rollers and pinion from jumping off of the trackway.

The switch 100 is gravity operated similarly to switches 25 and 25'. That is, the pinion 118 is held in its lowermost position by gravity, the meshing of the teeth of the pinion with the internal teeth of the ring 106 preventing vibration or rapid movement of the pinion upwardly along the trackway. During the tilting and all other movements of the airplane, the tubular body or cage turns bodily relative to the pinion 118 as gravity tends to keep the pinion in the same lowermost down position. The rollers 122 on the shaft of the pinion are normally contacting the bus bars 116, 116 closing the circuit through the respective auxiliary engine by means of the conductors 130, 132 connected to the bus bars 116, 116.

The control board knobs may be used at all times but the gravity switch controlling system is to be used only in an extreme emergency when the airplane has no other chance for safety.

The quantity and size of the auxiliary engines depend upon the make and size of the airplane or spacecraft, especially when the eight pairs of auxiliary engines are separated into eight single engines as described. For example, in the previously mentioned "eight pairs" of exhaust pipes which for each pair point in the same direction and orientation, only one of the exhaust pipes of each pair can be employed and then the system will be exactly the same as the system with the sixteen exhaust pipes, but will employ only eight auxiliary engines. In other words, the mentioned "pair" represents two exhaust pipes both pointing exactly in the same direction, which means that the thrust from both go in the same direction, with this separation instead of two exhaust pipes thrusting in each direction, will be thrust only a single pipe in each direction. This arrangement will provide less weight of the burden in the airplane which is very important especially in lighter planes.

Figure 12:
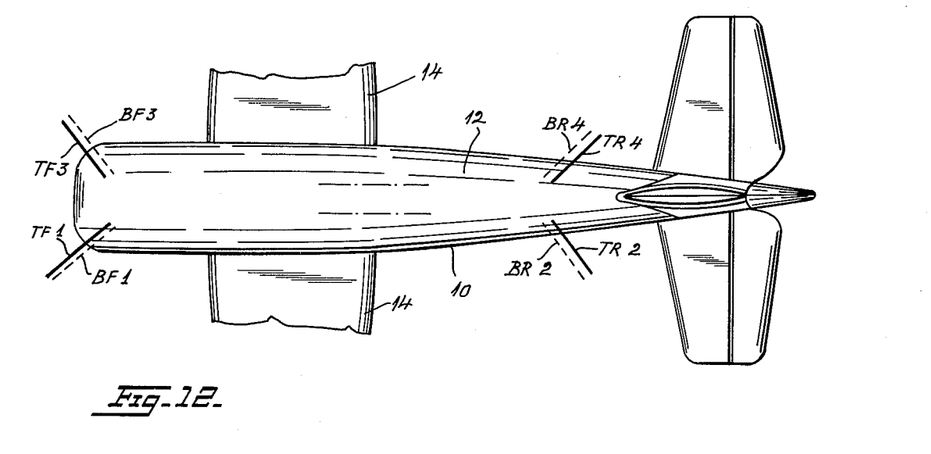
FIGS. 12 and 13 are fragmentary top-plan views of the fuselage showing diagrammatically the exhaust pipes of the engines at the top and at the bottom, only eight being shown, the solid lines representing the top pipes and broken lines the bottom pipes.
Figure 13:
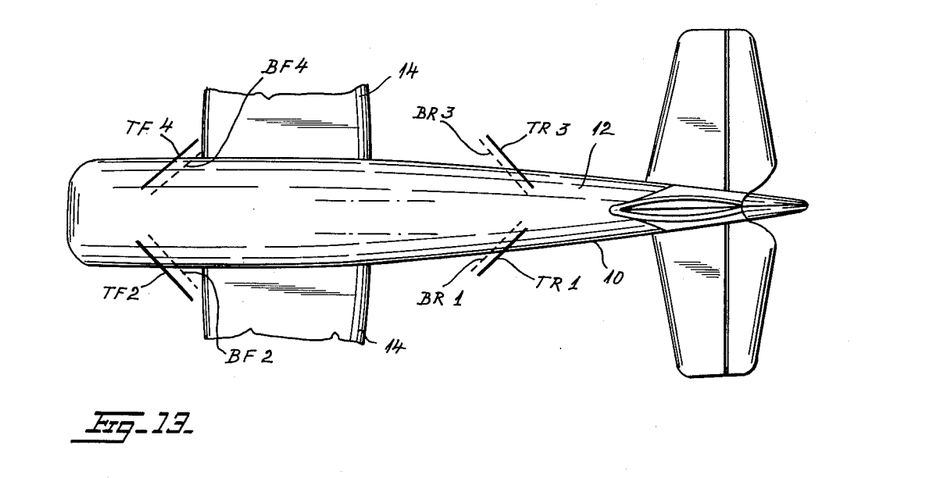

The separated pairs are TF1, TF3, BF1, BF3, TR2, TR4, BR2, BR4, shown in FIG. 12, or TF2, TF4, BF2, BF4, TR1, TR3, BR1, BR3 shown in FIG. 13.

The above separated individual eight exhaust pipes of the engines represent individual complete sets. Each set is capable individually of doing the same action as the eight pairs of exhaust pipes did together.

FIG. 12 shows the eight exhaust pipes pointing obliquely outwardly from the midcenter of the fuselage of the airplane and FIG. 13 shows the eight exhaust pipes pointing obliquely inwardly toward the midcenter of the fuselage of the airplane.

The invention is clearly drawn to the particular orientation and location of the exhaust pipes so that the thrusts for the exhaust pipes may be supplied from a common central station in the airplane according to conventional systems.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An emergency, auxiliary control system for aircraft, spacecraft and the like vehicle having an elongated fuselage, comprising in combination: sixteen auxiliary engines located on the fuselage at the four upper corners and at the four lower corners, these corners defining a rectangular parallelepiped geometrical figure, each of said auxiliary engines including an exhaust pipe extending axially outwardly of said fuselage to exert a thrusting force away from the fuselage and to effect a reactive force directed toward the fuselage, the exhaust pipes of each engine directed at 45° to the horizontal and vertical planes longitudinally and 45° outwardly of the stationary positions thereof on the fuselage, two of the pipes of two engines on top of said fuselage at the forward end thereof pointing obliquely upward, forward and oppositely laterally outward, two pipes of two other engines on top of said fuselage at the forward end thereof pointing obliquely upward, rearward and oppositely laterally outward, two pipes of two engines on top of said fuselage at the rear end thereof pointing obliquely upward, forward and oppositely laterally outward, two pipes of two engines on top of said fuselage at the rear end thereof pointing obliquely upward, rearward and oppositely laterally outward, two pipes of two engines underneath said fuselage at the forward end thereof pointing obliquely downward, forward and oppositely laterally outward, two pipes of two engines underneath said fuselage at the forward end thereof pointing obliquely downward, rearward and oppositely laterally outward, two pipes of two engines underneath said fuselage at the rear end thereof pointing obliquely downward, forward and oppositely laterally outward, two pipes of two engines underneath said fuselage at the rear end thereof pointing obliquely downward, rearward and oppositely laterally outward; gravity operated switches respectively mounted near each of the pipes, each of said switches having an internal movable contact element and fixed arcuate contacts oriented to be closed with said movable contact element in predetermined positions of tilt of said fuselage and said pipes, a manually operable switch connected in series with one of the gravity operated switches, starting circuits for the gravity switches adapted to operate only the gravity switches controlled automatically by the gravity directed balls, manually operated switches adapted to be operated for bringing the desired auxiliary engine into circuit, the exhaust pipes being arranged to simultaneously cooperate with each other, the gravity and manually operated exhaust pipes of the engines providing the correct turns, tilts, slips, rotations and falls, the manually controlled switches operating separately from the gravity controlled switches and adapted to provide vertical take-off, vertical landing, propulsion when in the air, upward, downward, forward, rearward, right, left and turning in all directions, with the respective auxiliary engines, said operations adapted to work even upon failure of the main driving engine and collapse of the wings.

2. An emergency, auxiliary control system for aircraft, spacecraft and the like vehicle having an elongated fuselage, carrying at least one main driving engine, comprising in combination: eight auxiliary engines located on the fuselage at the four upper corners and at the four lower corners, these corners defining a rectangular parallelepiped geometrical figure, each of said auxiliary engines including an exhaust pipe extending axially outwardly of said fuselage to exert a thrusting force away from the fuselage and to effect a reactive force directed toward the fuselage, the exhaust pipe of each engine being directed at 45° to the horizontal and vertical planes longitudinally and 45° outwardly of the stationary positions thereof on the fuselage, two of the pipes of two engines on top of said fuselage at the forward end thereof pointing obliquely upward, forward and oppositely laterally outward, two pipes of two engines on top of said fuselage at the rear end thereof pointing obliquely upward, rearward and oppositely laterally outward, two pipes of two engines underneath said fuselage at the forward end thereof pointing obliquely downward, forward and oppositely laterally outward, two pipes of two engines underneath said fuselage at the rear end thereof pointing obliquely downward, rearward and oppositely laterally outward, gravity operated switches respectively mounted near each of the pipes, each of said switches having an internal movable contact element and fixed arcuate contacts oriented to be closed with said movable contact element in predetermined positions of tilt of said fuselage and said pipes, a manually operable switch connected in series with one of the gravity operated switches, starting circuits for the gravity switches adapted to operate only the gravity switches controlled automatically by the gravity directed balls, manually operated switches adapted to be operated for bringing the desired auxiliary engine into circuit, the exhaust pipes arranged to simultaneously cooperate with each other, and gravity and manually controlled exhaust pipes of the engines providing the correct turns, tilts, slips, rotations and falls, the manually controlled switches operated separately from the gravity controlled switches and adapted to provide vertical take-off, vertical landing, propulsion when in the air, upward, downward, forward, rearward, right, left and turning in all directions with the respective auxiliary engines, said operations adapted to work even upon failure of the main driving engine and the collapse of the wings.

3. An emergency, auxiliary control system for aircraft, spacecraft and the like vehicle having an elongated fuselage carrying at least one main driving engine, comprising in combination: eight auxiliary engines located on the fuselage at the four upper corners and at the four lower corners, these corners defining a rectangular parallelepiped geometrical figure, each of said auxiliary engines including an exhaust pipe extending axially outwardly of said fuselage to exert a thrusting force away from the fuselage and to effect a reactive force directed toward the fuselage, the exhaust pipe of each engine being directed at 45° to the horizontal and vertical planes longitudinally and 45° outwardly of the stationary position thereof on the fuselage, two pipes of two engines on top of said fuselage at the forward end thereof pointing obliquely upward, rearward and oppositely laterally outward, two pipes of two engines on top of said fuselage at the rear end thereof pointing obliquely upward, forward and oppositely laterally outward, two pipes of two engines underneath said fuselage at the forward end thereof pointing obliquely downward, rearward and oppositely laterally outward, two pipes of two engines underneath said fuselage at the rear end thereof pointing obliquely downward, forward and oppositely laterally outward, gravity operated switches respectively mounted near each of the pipes, each of said switches having an internal movable contact element and fixed arcuate contacts oriented to be closed with said movable contact element in predetermined positions of tilt of said fuselage and said pipes, a manually operable switch connected in series with one of the gravity operated switches, starting circuits for the gravity switches adapted to operate only the gravity switches controlled automatically by the gravity directed balls, manually operated switches adapted to be operated for bringing the desired auxiliary engine into circuit, the exhaust pipes arranged to simultaneously cooperate with each other, the gravity and manually controlled exhaust pipes of the engines providing the correct turns, tilts, slips, rotations and falls, the manually controlled switches operating separately from the gravity controlled switches and adapted to provide vertical take-off, vertical landing, propulsion when in the air, upward, downward, forward, rearward, right, left and turning in all directions with the respective auxiliary engines, said operations adapted to work even upon failure of the main driving engine and the collapse of the wings.

4. An emergency auxiliary control system for aircraft, spacecraft and the like vehicle as described in claim 1 wherein the particularly oriented and located rearward exhaust pipes of the auxiliary engines drive the aircraft or spacecraft forward even upon failure of the main driving engine and the collapse of the wings.

5. An emergency auxiliary control system for aircraft, spacecraft and the like vehicle as described in claim 1 wherein the particularly oriented and located and applied bottom exhaust pipes of the auxiliary engines are used for vertical take-off and vertical landing of the aircraft or spacecraft.

References Cited in the file of this patent

UNITED STATES PATENTS

| | | |
|---|---|---|
| 2,395,435 | Thompson et al. | Feb. 26, 1946 |
| 2,449,177 | Perry | Sept. 14, 1948 |
| 2,499,349 | Ayres | Mar. 7, 1950 |
| 2,630,283 | Hanson | Mar. 3, 1953 |
| 2,780,688 | Stec | Feb. 5, 1957 |
| 2,942,807 | Gallagher | June 28, 1960 |
| 2,950,365 | Bolstad | Aug. 23, 1960 |
| 3,032,296 | Streubel | May 1, 1962 |
| 3,061,241 | Holland | Oct. 30, 1962 |

FOREIGN PATENTS

| | | |
|---|---|---|
| 610,143 | Great Britain | Oct. 12, 1948 |